3,032,595
ORTHO-ALKYLATION OF PHENOLS

Martin B. Neuworth, Robert J. Laufer, and Edward P. Previc, Pittsburgh, Pa., assignors to Consolidation Coal Company, Pittsburgh, Pa., a corporation of Pennsylvania
No Drawing. Filed July 10, 1958, Ser. No. 747,596
11 Claims. (Cl. 260—624)

This invention relates to the selective ortho-alkylation of phenols. More particularly, it relates to the reaction of isobutylene and o-cresol, a reaction product of aluminum and a thiophenol being added as ortho-directing alkylation catalyst.

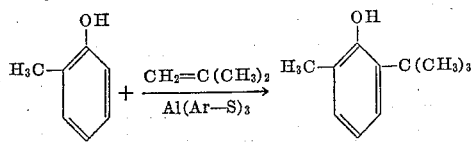

The compound 6-t-butyl-2,4-xylenol is a known and important article of commerce, finding extensive application as an antioxidant used in gasoline, rubber, oils, plastics and the like. Inasmuch as o-cresol is an important raw material, now available in abundant quantity, a process suitable for commercial use for obtaining 6-t-butyl-2,4-xylenol starting with o-cresol is of considerable importance. In two such proposed routes, o-cresol is first converted to 6-t-butyl-o-cresol. This latter compound is useful per se as an antioxidant for gasoline, in addition to being an intermediate for the formation of 6-t-butyl-2,4-xylenol.

Heretofore, to form 6-t-butyl-o-cresol from o-cresol, it has been proposed to react o-cresol with isobutylene in the presence of sulfuric acid as catalyst. This method, while of utility, is insufficiently selective. Thus, in addition to major amounts of 6-t-butyl-o-cresol being formed, substantial amounts of 4-t-butyl-o-cresol and 4,6-di-t-butyl-o-cresol are also formed. The alkylation of phenols in the presence of aluminum phenoxide as catalyst has also been proposed. The latter method possesses the inherent disadvantage that, by the very nature of its formation from the phenol, a substantial portion of the phenol is lost for subsequent alkylation. Thus, where the catalyst is genetically formed in situ from a given quantity of phenol, complete conversion of the phenol originally present can not be obtained.

Accordingly, it is an object of the present invention to provide a novel method for the ortho-alkylation of phenols.

It is an additional object to provide a method for the direct conversion of o-cresol to 6-t-butyl-o-cresol in high yields.

In accordance with this invention, a reaction product of aluminum and a thiophenol is used as a catalyst in the reaction between a phenol having an unsubstituted ortho position and an unsaturated aliphatic hydrocarbon containing from three to twelve carbon atoms, whereby the phenol is selectively alkylated in the ortho position. In its more specific aspects, the process of this invention is particularly suitable and preferred for the selective t-butylation of o-cresol to form 6-t-butyl-o-cresol in high yield.

Temperatures between 30 and 250° C. are considered suitable for the alkylation reaction. Preferably, the reaction is carried out at a temperature between 70 and 130° C. It is particularly preferred, in order to obtain maximal yields, that this reaction be carried out at a temperature between 90 and 110° C. The process of this invention is considered generally applicable to a hydroxy or polyhydroxy aromatic compound, of either monocyclic or polycyclic structure, which contains a reactive unsubstituted position ortho to a phenolic hydroxyl group.

Thus, included are the various substituted phenols, naphthols, hydroxyanthracenes, hydroxyphenanthrenes, substituted cresols and xylenols, and other alkyl phenols bearing straight or branched chains, cyclohexyl phenols, benzyl phenols, phenyl phenols, guaiacol, resorcinol, etc.

Suitable monoolefinic alkylating agents that may be used for substituting an alkyl group in the ortho position of the phenolic ring include propylene, isobutylene, propylene trimer, isoamylene, propylene tetramer, diisobutylene, and the like. In general, unsaturated aliphatic hydrocarbons having from three to twelve carbon atoms, such as the various olefins and polyolefins, are contemplated for the practice of this invention. Preferred catalysts for the selective ortho-alkylation of phenols particularly include aluminum thiophenoxide, aluminum thiocresoxide and aluminum thioxylenoxide.

The alkylation reaction is particularly suitable for the selective t-butylation of o-cresol. It has been found preferable and desirable to perform the butylation reaction in a closed vessel at superatmospheric pressure using liquid isobutylene at pressures between 25 and 1000 pounds per square inch gage (p.s.i.g.). The pressure is not an independent parameter but is determined by the reactants used, the free space available in the reaction vessel, and the reaction temperature.

For the alkylation reaction, amounts of catalyst, based on aluminum content, between 0.1 and 1.0 percent by weight of the phenol are suitable. While catalytic quantities in excess of this amount may be used, this offers no additional advantage and may make more difficult any desired subsequent removal of catalyst. Amounts of catalyst, based on aluminum content, from 0.5 percent up to not more than one percent by weight of the phenol are preferred.

The catalysts of this reaction are suitably prepared by reacting one molecular proportion of aluminum with at least three molecular proportions of a thiophenol, as described in the copending application of Robert J. Laufer, Serial No. 747,589, filed July 10, 1958, entitled "Aluminum Thiophenoxide Catalysts and Method for Their Preparation," and assigned to the assignee of the present application. It is preferred to prepare the catalyst by reacting an aluminum amalgam, preformed or formed in situ, with an excess of a thiophenol at a temperature between 0 and 400° C. to form an aluminum thiophenoxide catalyst. The reaction temperature employed is basically a function of the activity of the specific amalgam used.

While the reaction between aluminum and a thiophenol is not considered limited by the nature of the thiophenol employed, it is particularly preferred to use thiophenol, thiocresol and thioxylenol as the selected thiophenols. The aluminum amalgam is preferably formed in situ by treating aluminum with a suitable mercury salt, such as mercuric chloride, in the thiophenol whose aluminum salt is to be prepared. Other methods of preparing the amalgam may also be used. For example, the aluminum may be treated with an ethereal solution of mercuric chloride to preform the amalgam. Or it may first be etched with sodium hydroxide, followed by mercuric chloride treatment, followed by extensive solvent washing. Such amalgams react vigorously with thiophenols to form the corresponding aluminum thiophenoxide. However, for large-scale use, amalgamation in situ is preferred.

It is also considered feasible to form a reaction product by reacting aluminum directly with a thiophenol in the absence of a mercury compound. However, to accomplish this, reaction at superatmospheric pressure at a temperature between 200 and 400° C. is required. A temperature between 250 and 300° C. is desirable for this reaction, a temperature of about 270° C. being particularly preferable. A reaction time between thirty minutes and three hours is usually sufficient for completion of the reaction. Suitable pressures, which depend upon reaction conditons used, may be between 25 and 1000 p.s.i.g. The thiophenol is generally present in considerable excess, and may be removed from the reaction product of aluminum and the thiophenol by venting the autoclave, i.e., reducing the pressure, while at reaction temperature, upon completion of the reaction. Alternatively, all the reaction products may be recovered and a solvent, such as xylene or ether, used to remove any excess thiophenol present. Ether washing is suitable for removing most of the organic contaminants that may be formed during the reaction. Any unreacted aluminum may also be readily removed, as the desired reaction product of aluminum and thiophenol may be slurried off with the ether, leaving the aluminum behind. Because this reaction is accompanied by the formation of side products such as diphenyl sulfide, thianthrene, aluminum sulfide, and the like, more elaborate purification procedures are required compared with the preferred amalgamation technique. However, even when contaminated, these catalysts retain their activity. The activity is diluted, however, by the probable presence of aluminum sulfide, which is not removed by solvent washing.

The aluminum thiophenoxide salts obtained are gray-to-white powders. When prepared by the amalgamation technique, they are contaminated only with traces of mercury and thiophenols. They are quite active as alkylation catalysts without further treatment. Where additional purification is desired, the catalyst may be dissolved in a suitable hot solvent, such as xylene, and the solution is then filtered or centrifuged to remove mercury and traces of aluminum, if any, that may be present. The aluminum salts of aromatic thiols are white powders when pure, and are soluble in cold anhydrous alcohols, tar acids, chloroform, and glacial acetic acid and in hot aromatic hydrocarbons. They are insoluble in saturated hydrocarbons and carbon tetrachloride and appear to undergo either complexing or similar types of reaction with ethyl ether, dioxane and acetone. The salts are slowly decomposed in cold water, and somewhat more rapidly in aqueous acids or bases. They appear to be thermally stable, at least to 250° C., and may be sensitive to exposure to oxygen. When prepared by the direct reaction of aluminum and a thiophenol, a black powder is usually obtained, the color being due to the presence of contaminants.

The following examples illustrate this invention but are not intended as restrictions thereof.

*Example 1.—Butylation of o-Cresol Using Aluminum Thiophenoxide Catalyst*

Thirty grams of aluminum thiophenoxide catalyst in the form of a free-flowing black powder and 497.5 grams of o-cresol were heated to 100° C. in a 2-liter stirred autoclave. Liquid isobutylene is an amount of 500 grams was charged to the autoclave. The products were held for one hour at temperature, a maximum pressure of 157 p.s.i.g. being attained. The final pressure was 70 p.s.i.g. The reaction product was hydrolyzed with 6 N HCl. Any unreacted thiophenol liberated was then removed by washing with ammonium hydroxide, thereby also neutralizing the acid. Approximately 89 percent of the o-cresol was converted. Of the converted material, 92 percent was 6-t-butyl-o-cresol with approximately 4 percent each of 4-t-butyl-o-cresol and 4,6-di-t-butyl-o-cresol.

*Example 2.—Butylation of o-Cresol Using an Aluminum Thiophenoxide Catalyst Formed in Situ*

To form the catalyst, 61 grams of thiophenol and 5 grams of aluminum turnings in 200 ml. of xylene were reacted for two hours at a temperature of 270° C. in a 2-liter stirred autoclave. A maximum pressure of 300 p.s.i.g. was developed. While at 200° C., all volatile components, principally xylene and unreacted thiophenol, were vented. The autoclave was cooled to room temperature, and 500 grams of o-cresol was added thereto. The system was then heated to 100° C., and 270 grams of isobutylene was added. The reaction was allowed to proceed for one hour at a temperature of approximately 105° C., attaining a maximum pressure of 75 p.s.i.g. At the end of the reaction, the pressure was 35 p.s.i.g. The contents were first hydrolyzed with 6 N hydrochloric acid and then neutralized with sodium bicarbonate, and the butylated o-cresol was recovered. Approximately 90 percent of the o-cresol was converted, with more than 90 percent of the converted material consisting of 6-t-butyl-o-cresol.

*Example 3.—Butylation of o-Cresol Using Aluminum Thiocresoxide Catalyst*

Five hundred grams of o-cresol was placed in a stirred autoclave together with 36.7 grams of aluminum thiocresoxide, which had been prepared by reaction of an aluminum amalgam with mixed thiocresols. The aluminum amalgam was first prepared by reaction of aluminum with a methanolic solution of mercuric chloride. The mixture was heated to 100° C. and to this was added 260 grams of liquid isobutylene. The resultant pressure was 64 p.s.i.g. The reactants were maintained at 100° C. for one hour and fifteen minutes, the final pressure dropping to 30 p.s.i.g. The contents of the autoclave were washed with hydrochloric acid to destry the catalyst, followed by washing with water to remove salts. This was followed by washing with aqueous ammonium hydroxide to remove any thiocresols that had been freed by the acid, followed by a water washing to remove any salts such as ammonium chloride. The contents were then dried azeotropically, by addition of toluene, and distilled in a packed column. Approximately 90 percent of the o-cresol was converted. Of the converted material, 93 percent was 6-t-butyl-o-cresol with 3½ percent each of 4-t-butyl-o-cresol and 4,6-di-t-butyl-o-cresol.

*Example 4.—Butylation of Phenol*

An aluminum thiophenoxide catalyst was prepared by reacting 500 grams of thiophenol with 5 grams of aluminum turnings at a temperature of 275° C. for two hours in a stirred autoclave at superatmospheric pressure. Excess thiophenol present was then vented while the autoclave was still hot. The autoclave was then cooled to room temperature and 421.5 grams of phenol was added to the catalyst that had been formed. The mixture was then heated to 100° C. and 250 grams of isobutylene was added thereto. The initial pressure was 90 p.s.i.g. The reactants were maintained at 100° C. for three hours. The contents were then worked up in the same manner as described in Example 3. A conversion of phenol of 64 percent was obtained, of which 85 percent was o-t-butylphenol, 7 percent was 2,6-di-t-butylphenol, and 8 percent was 2,4,6-tri-t-butylphenol.

*Example 5.—Propylation of o-Cresol*

To a 2-liter stirred autoclave were added, at room temperature, 497.5 grams of o-cresol, 96.6 grams aluminum thiocresoxide (prepared as described in Example 3), and 200 grams propylene. The contents of the autoclave were heated to 200° C. and maintained at a temperature between 200 and 210° C. for one hour. A maximum pressure of 270 p.s.i.g. was developed. The autoclave was cooled and the contents were worked up in the same manner as described in Example 3. Sixty percent of the o-cresol was converted. Of the converted material, 94 percent was 6-isopropyl-o-cresol.

The use of aluminum thiophenoxide and aluminum thiocresoxide are particularly preferred as catalysts for the selective t-butylation of o-cresol to form 6-t-butyl-o-cresol. Insofar as can be determined, there has been no suggestion heretofore that any thiophenol or any metallic salt thereof may function as an alkylation or butylation catalyst. While various conditions have been set forth and specific examples given for alkylating phenols using aluminum thiophenoxide catalysts, other variations will readily suggest themselves to those skilled in this art. Thus, within the scope of the appended claims, the invention may be practiced otherwise than as specifically illustrated and described.

We claim:

1. A process for ring-alkylating a phenol in ortho-position which comprises reacting a phenol having an unsubstituted ortho-position with a monoolefinic aliphatic hydrocarbon alkylating agent containing from three to twelve carbon atoms at a temperature between 30 and 250° C., an aluminum salt of an aromatic thiol selected from the group consisting of thiophenol, thiocresols, and thioxylenols being added as ortho-directing alkylation catalyst, at least 0.1 percent of catalyst, calculated on aluminum content, being added per weight of said phenol, whereby principally said ortho position is alkylated.

2. A process for ring-alkylating a phenol in ortho position which comprises reacting a monocyclic phenol having an unsubstituted ortho position with a monoolefinic aliphatic hydrocarbon alkylating agent containing from three to twelve carbon atoms at a temperature between 30 and 250° C., aluminum thiophenoxide being added as ortho-directing alkylation catalyst, at least 0.1 percent of catalyst, calculated on aluminum content, being added per weight of said phenol, whereby principally said ortho position is alkylated.

3. A process for ring-alkylating o-cresol to form 6-alkyl-o-cresol which comprises reacting o-cresol with a monoolefinic aliphatic hydrocarbon alkylating agent containing from three to twelve carbon atoms at a temperature between 30 and 250° C., an aluminum salt of an aromatic thiol selected from the group consisting of thiophenol, thiocresols, and thioxylenols being added as ortho-directing alkylation catalyst, at least 0.1 percent of catalyst, calculated on aluminum content, being added per weight of o-cresol, whereby 6-alkyl-o-cresol is formed as principal product.

4. A process for the selective t-butylation of o-cresol to form 6-t-butyl-o-cresol which comprises reacting o-cresol with isobutylene at a temperature between 30 and 250° C., an aluminum salt of an aromatic thiol selected from the group consisting of thiophenol, thiocresols, and thioxylenols being added as ortho-directing alkylation catalyst, at least 0.1 percent of catalyst, calculated on aluminum content, being added per weight of o-cresol, whereby 6-t-butyl-o-cresol is formed as principal product.

5. The process of claim 4 wherein said catalyst is aluminum thiophenoxide.

6. The process of claim 4 wherein said catalyst is aluminum thiocresoxide.

7. The process of claim 1 wherein said temperature is between 90 and 110° C.

8. A process for the selective t-butylation of o-cresol to form 6-t-butyl-o-cresol which comprises adding o-cresol and at least an equimolar quantity of isobutylene to a pressure reaction vessel containing an aluminum salt of an aromatic thiol selected from the group consisting of thiophenol, thiocresols, and thioxylenols as ortho-directing alkylation catalyst, at least 0.1 and not more than one percent of catalyst, calculated on aluminum content, being present per weight of o-cresol, and heating the contents of said vessel at superatmospheric pressure to a temperature between 30 and 250° C. to form 6-t-butyl-o-cresol as principal product.

9. A process for the selective t-butylation of o-cresol to form 6-t-butyl-o-cresol which comprises reacting o-cresol with at least an equimolar quantity of isobutylene at superatmospheric pressure at a temperature between 30 and 250° C., aluminum thiophenoxide being added as ortho-directing alkylation catalyst, at least 0.1 and not more than one percent of catalyst, calculated on aluminum content being added per weight of o-cresol, whereby 6-t-butyl-o-cresol is formed as principal product.

10. The process of claim 9 wherein said temperature is between 90 and 110° C.

11. A process for preparing 6-isopropyl-o-cresol which comprises reacting o-cresol with propylene at a temperature between 30 and 250° C., aluminum thiocresoxide being added as ortho-directing alkylation catalyst, at least 0.1 percent of catalyst, calculated on aluminum content, being added per weight of o-cresol, whereby 6-isopropyl-o-cresol is formed as principal product.

References Cited in the file of this patent

UNITED STATES PATENTS

| | | |
|---|---|---|
| 2,413,598 | Ballard et al. | Dec. 31, 1946 |
| 2,523,939 | Braidwood | Sept. 26, 1950 |
| 2,560,666 | Stevens et al. | July 17, 1951 |
| 2,655,546 | Stevens et al. | Oct. 13, 1953 |
| 2,831,898 | Ecke et al. | Apr. 22, 1958 |
| 2,923,745 | Buls et al. | Feb. 2, 1960 |

FOREIGN PATENTS

| | | |
|---|---|---|
| 776,204 | Great Britain | June 5, 1957 |

UNITED STATES PATENT OFFICE

CERTIFICATE OF CORRECTION

Patent No. 3,032,595

May 1, 1962

Martin B. Newworth et al.

It is hereby certified that error appears in the above numbered patent requiring correction and that the said Letters Patent should read as corrected below.

Column 3, line 55, for "is" read -- in --; column 6, line 5, for the claim reference numeral "1" read -- 4 --.

Signed and sealed this 4th day of September 1962.

(SEAL)
Attest:

ERNEST W. SWIDER
Attesting Officer

DAVID L. LADD
Commissioner of Patents